(12) United States Patent
Kimura et al.

(10) Patent No.: US 7,401,393 B2
(45) Date of Patent: *Jul. 22, 2008

(54) METHOD FOR REMOVING SOLDER BUMPS FROM LSI

(75) Inventors: Motoko Kimura, Kawasaki (JP); Takeshi Miitsu, Hadano (JP); Takeshi Takahashi, Hadano (JP); Kaoru Katayama, Hadano (JP); Shiro Yamashita, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 728 days.

This patent is subject to a terminal disclaimer.

(21) Appl. No.: 10/847,991

(22) Filed: May 17, 2004

(65) Prior Publication Data

US 2004/0206805 A1      Oct. 21, 2004

Related U.S. Application Data

(63) Continuation of application No. 10/192,478, filed on Jul. 9, 2002, now Pat. No. 6,739,045.

(30) Foreign Application Priority Data

Jul. 9, 2001    (JP) .............................. 2001-208147

(51) Int. Cl.
*B23P 19/00*    (2006.01)
*H05K 3/34*    (2006.01)

(52) U.S. Cl. .................. 29/426.1; 29/426.5; 29/840; 29/843; 228/6.2

(58) Field of Classification Search ............... 29/426.1, 29/426.5, 840, 843; 228/6.2
See application file for complete search history.

(56) References Cited

U.S. PATENT DOCUMENTS 6,739,045 B2 *    5/2004    Kimura et al. ............... 29/840

\* cited by examiner

*Primary Examiner*—C. J Arbes
(74) *Attorney, Agent, or Firm*—Townsend and Townsend and Crew LLP

(57) ABSTRACT

The present invention provides a method for removing solder adhering to an LSI. In this method, a plate-shaped first member for causing molten solder to adhere thereto is mounted on top of a heater. An LSI is placed on top of the first member with the surface on which solder is attached facing downward. A second member for adding a load to the LSI is placed on top of the LSI. The heater is heated up to heat the first member and the LSI, and to melt the solder. The molten solder is transferred to the first member. A suction mechanism is positioned at a location a predetermined distance away from the top surface of the second member. The second member and the LSI are attracted by the suction mechanism, and the LSI is pulled away from the first member. The solder is thereby removed from the LSI.

19 Claims, 1 Drawing Sheet

METHOD FOR REMOVING SOLDER BUMPS FROM LSI

BACKGROUND OF THE INVENTION

1. Field of the Invention

The present invention relates to a method for removing solder bumps, which form on a semiconductor chip (LSI).

2. Description of the Related Art

There are cases when solder bumps are used to connect an LSI onto a wiring substrate. A connection that uses solder bumps is called a ball grid array (BGA) connection. In this case, for example, approximately 5000 solder bumps will be used to connect a 20 mm LSI. Thus, there are cases when connection defects occur due to misconnections between the connection terminals of a multi-layer wiring substrate and an LSI. When connection defects such as this occur, it becomes necessary to perform repair work, by which the LSI is removed from the wiring substrate and re-connected. Solder is adhering to the connecting surface of the LSI removed from the wiring board at this time. Therefore, this solder is removed using a solder removing device, and solder bumps are once again formed on the connecting surface of the LSI.

As a solder removing device, a device comprising a mechanism for pressing the surface of an LSI to which solder bumps are attached onto a heated copper plate is well known. First, this device attracts the LSI using a suction mechanism. Next, the device uses the suction mechanism to press the surface of the LSI to which the solder bumps are attached against the copper plate. When maintained in this state for a time, the solder bumps are heated and melt. The molten solder adheres to the copper plate. Thereafter, the device raises the suction mechanism with the LSI attracted as-is, pulling the LSI away from the copper plate. In accordance therewith, the solder bumps, which had been adhering to the LSI, are removed. Furthermore, the LSI referred to here is a packaged-type LSI.

As technology related to a solder removing device such as this, there is, for example, the technologies disclosed in Japan Patent Laid-open No. 11-285814 and Japan Patent Laid-open No. 2001-7509.

SUMMARY OF THE INVENTION

In recent years, there have been cases in which bare chip-type LSIs have been connected directly to substrates. Accordingly, in repairing these bare chips, the inventors of the present invention tried removing the solder bumps using the above-described solder removing device. However, when the attracting device pressed the bare chip against the copper plate, there were instances when a mechanical load was applied to the bare chip by the suction mechanism, causing fractures and cracks to be generated in the bare chip. Further, it was also learned that there were cases in which the mechanical load resulting from the suction mechanism gave rise to the problem of damage being caused to the passivation layer and metallization formed on the bare chip. In addition, there were also instance when the solder bumps adhering to the bare chip could not be removed all at once. In these cases, the volume of solder adhering to a bare chip following removal work varies. Thus, it was learned that, when reforming solder bumps on this bare chip, the volumes of the respective solder bumps would also vary, giving rise to the problem that the heights of the solder bumps could not be made uniform to within acceptable levels.

Therefore, the present invention is to provide a method, which does not damage a bare chip when removing solder from a bare chip-type LSI.

Another, the present invention is to provide a method, which enables the heights of solder bumps to be made uniform to within acceptable levels when reforming solder bumps on an LSI.

In the present invention, a first member of a plate shape for causing the adherence of molten solder is mounted on top of a heater. An LSI is placed on top of the first member with the surface on which the solder is attached facing downward. A second member for adding a load to the LSI is placed on top of the LSI. A heater is heated up, the first member and the LSI are heated and the solder is melted. The molten solder is transferred to the first member. A suction mechanism is positioned at a location a predetermined distance away from the top surface of the second member. The second member and LSI are attracted by the suction mechanism, and the LSI is pulled away from the first member. The solder is thereby removed from the LSI.

According to this method, damage is not done to a bare chip-type LSI when solder is removed. Further, the height of the solder remaining on the LSI following solder removal becomes uniform to within acceptable levels.

DETAILED DESCRIPTION OF THE PREFERRED EMBODIMENTS

The contents of an embodiment of a leveling method will be explained hereinbelow by referring to the figures.

First, one example of a solder removing device used in this embodiment will be explained. The solder removing device comprises at the least a suction mechanism (suction head) 50 for attracting and conveying an LSI 10, which has been placed on top of a heated metal plate (Cu plate) 20, and a base heater 30 on which the Cu plate 20 is mounted. Suction head 50 is also utilized for conveying LSI 10 and a weight 40 over Cu plate 20. Base heater 30 heats Cu plate 20, which is placed thereupon. In addition to these elements, the solder removing device comprises a moving device for moving either suction head 50 or base heater 30 in the X-Y-Z directions. This solder removing device heats solder attached to the connecting surface of LSI 10, and causes the molten solder to adhere to heated CU plate 20. The solder adhering to LSI 10 is thereby removed.

Next, the contents of the leveling process will be explained in detail.

Prior to leveling work, an LSI 10 in need of repair work is removed for the wiring substrate on which this LSI 10 is mounted. This work is performed using a well-known method. In this embodiment, LSI signifies a bare chip-type LSI. Solder bumps used for connecting with the wiring substrate are attached to the removed LSI 10 in a quite nonuniform state.

FIG. 1 is a set of diagrams illustrating a leveling process.

Figure 1A:
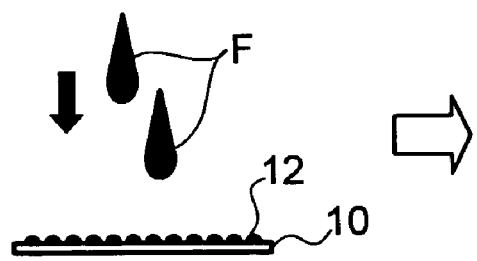
FIG. 1 is a set of diagrams illustrating a leveling process.

At first, as shown in FIG. 1(A), a suitable amount of flux F is supplied to the surface on which solder bumps 12 are adhering to the LSI 10. For example, flux F is supplied to LSI 10 by either dripping, coating or spraying.

An oxide film is formed on the surfaces of the solder bumps 12 adhering to LSI 10. It is hard to melt a solder bump on which an oxide film has formed. The oxide film on the surfaces of the solder bumps 12 is removed by supplying flux F to the surface on which the solder bumps 12 are attached. Thus, the solder bumps 12 become easy to melt. Further, the solder bumps melt uniformly. Further, supplying flux F enhances the spreading of the molten solder. Therefore, when transferring the solder to the Cu plate in a process, which will be explained hereinbelow, the solder is transferred uniformly to the Cu plate. As a result of this, the solder bumps are uniformly removed from the surface of an LSI. Accordingly, the height of the bumps remaining on the surface of the LSI can be made uniform (leveling).

Figure 1B:
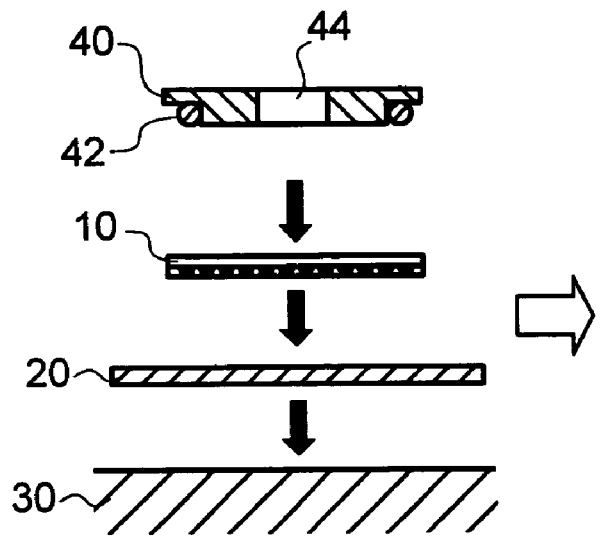

Next, as shown in FIG. 1(B), Cu plate 20 is placed on base heater 30. In addition, LSI 10 is mounted on top of this Cu plate 20 with the surface to which the solder bumps are attached facing downward.

Ni and Au plating is performed on the surface of the Cu plate 20. Further, a plurality of parallel grooves formed at a predetermined pitch is arranged so as to be nearly orthogonal to one another on the surface of Cu plate 20. That is, the shape of the surface of Cu plate 20 is a rough mesh shape. Furthermore, as long as it is a mesh shape, the plurality of grooves can intersect and do not necessarily have to be orthogonal. The surface area of Cu plate 20 becomes larger by making the surface of Cu plate 20 a rough mesh shape. Therefore, since the area over which the molten solder spreads also becomes larger, the percentage of solder removed also increases.

Furthermore, a Cu plate is used in this leveling process, but so long as it is a material to which solder readily adheres, it does not have to be a Cu plate. For example, it can be a plate-shaped member comprising a metal other than Cu. Of course, it can also be a member formed from a material other than a metal.

Furthermore, a weight 40 is placed on top of the LSI 10. Weight 40 is a cylindrical thin plate in which a hole 44 is formed in the center part. A convex portion having a cylindrical periphery is formed on the bottom surface of the central portion of this thin plate. A silicon gum ring 42 is mounted to this convex portion.

Weight 40 is a member for adding a predetermined load to LSI 10. Weight 40 promotes the transfer of molten solder to Cu plate 20.

Now then, the solder removing device described hereinabove used the suction mechanism to press an LSI against a Cu plate. The load, which this suction mechanism applies to an LSI, is at a level, which does not exert excessive stress on a packaged-type LSI. However, this load does exert excessive stress on a bare chip-type LSI. That is, when a mechanical load is applied to a bare chip-type LSI by the suction mechanism, excessive stress is generated in the LSI. Thus, fractures and cracks are generated in the chip. Or, the mechanical load resulting from the suction mechanism causes damage to the passivation layer or metallization formed on the chip.

Accordingly, in this leveling process, the pressing of a bare chip-type LSI 10 against Cu plate 20 by suction head 50 does not occur. However, by simply mounting LSI 10 on Cu plate 20, the force exerted on the solder between LSI 10 and Cu plate 20 becomes the self-weight of LSI 10 alone. In this case, it was learned that the pressure on the molten solder was insufficient, and that the molten solder is not fully transferred to Cu plate 20. Accordingly, in this leveling process, the load applied to the molten solder is adjusted using weight 40.

It is desirable that a lightweight plastic object be used as weight 40. However, so long as it is a weight that enables a desired load to be applied, this weight can be formed from an arbitrary material other than plastic, such as a metal for example. To prevent scratches on the surface of an LSI, it is desirable that a silicon gum ring 42 be mounted to weight 40 as a cushioning material.

Furthermore, the shape of weight 40 is not limited to the shape shown in the figure, and can be made into another, arbitrary shape. The hole 44 in the center portion of weight 40 is formed so that the suction force of the suction head is exerted on LSI 10 when the suction head attracts weight 40 and LSI 10 simultaneously. However, hole 44 does not necessarily have to be in the center portion of weight 40. The hole can be formed in another location so long as the entire LSI 10 can be attracted in a well-balanced condition. Further, hole 44 need not be formed in weight 40 if another method for attracting an LSI is used.

Figure 1C:
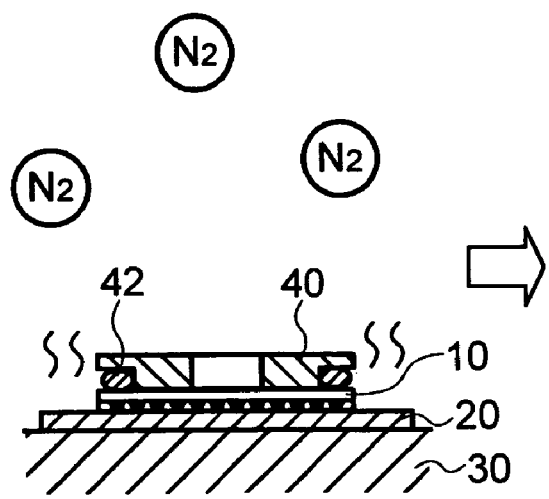

Next, as shown in FIG. 1(C), a nitrogen atmosphere is created inside the solder removing device in a state in which weight 40 is mounted on top of LSI 10. Or, weight 40 can be mounted on top of LSI 10 after creating a nitrogen atmosphere inside the solder removing device. Furthermore, the process shown in FIG. 1(B) can also be performed after creating a nitrogen atmosphere inside the solder removing device.

Next, base heater 30 is heated up, and Cu plate 20, LSI 10 and weight 40, which are mounted on top of base heater 30, are heated. Solder bumps 12 adhering to LSI 10 are melted by this heating. The molten solder spreads over and adheres to the top of Cu plate 20.

Figure 1D:
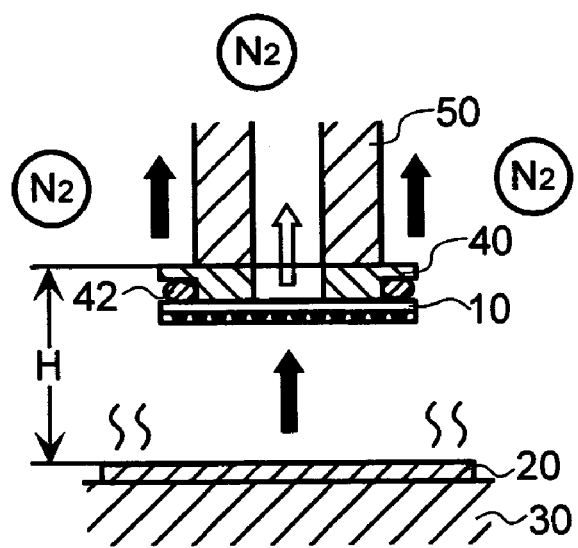

Next, as shown in FIG. 1(D), the end part of suction head 50 approaches up to a desired distance H from the top surface of weight 40. Then, suction head 50 commences suction at a location separated by distance H from the top surface of weight 40. When this happens, weight 40, and, by way of hole 44 formed in weight 40, LSI 10 are subjected to suctioning. As a result of this, weight 40 and LSI 10 are attracted to suction head 50 simultaneously.

If the end part of suction head 50 is brought in contact with the top surface of weight 40 prior to suction head 50 commencing suctioning, there is the risk of a mechanical load being applied to LSI 10 via weight 40. Thus, suction head 50 performs suctioning in a state, wherein suction head 50 and the top surface of weight 40 are separated by distance H. In accordance therewith, there is no unnecessary load exerted on LSI 10, nor is any damage caused to LSI 10. Further, molten solder is capable of separating from the LSI to the extent desired.

Thereafter, suction head 50 rises up, and LSI 10 completely separates from Cu plate 20. The leveling process is thereby completed.

The inventors studied various conditions in the solder bump leveling process. The results of these studies will be explained hereinbelow.

First, the inventors studied the supply W of flux F. More specifically, we studied the state of removal of solder bumps while making various changes to the quantity of flux F supplied. As a result of this, it was learned that the ideal supply W of flux F falls in the range of W=0.5×Q to Q (g). Here, Q is expressed by the following formula.

$Q$=(bump area $S$×average bump height $h$–total bump volume $V$)×specific gravity of flux $k$ Q corresponds to the quantity of fill for filling flux up to the height of the solder bumps from the surface of the LSI on which the solder bumps are attached. That is, in a case in which W=Q, the space from the surface of the LSI on which the solder bumps are attached to the height of the solder bumps is filled with flux.

When the supply W of flux F is W<0.5×Q, the supply of flux is relatively small. Thus, the oxide film on the solder bumps cannot be uniformly or adequately removed. In this case, the molten solder does not spread out sufficiently. As a result, the solder bumps are not uniformly removed. Conversely, when the supply of flux F is W>Q, due to the surface tension of the large quantity of flux, suctioning cannot be performed in a well-balanced condition when LSI 10 is attracted by suction head 50. As a result of this, the solder bumps are not removed uniformly.

Next, the inventors studied the pitch p1 of the parallel grooves formed in the surface of Cu plate 20. As a result of this, it was learned that it is desirable for the pitch p1 to be less than the array pitch p2 of the solder bumps formed on an LSI 10. For example, when pitch p2 is 0.3 mm, it is best for pitch p1 to be less than 0.3 mm. In this case, more specifically, it is best for the width of the grooves (concave portions) to be less than 0.15 mm, and for the width between one groove and another (the width of the convex portion) to be less than 0.15 mm.

When pitch p1 is larger than pitch p2 (p1>p2), there are parts on the surface of Cu plate 20 where the molten solder spreads, and parts where it does not spread. Thus, the adherence of molten solder to Cu plate 20 becomes nonuniform. This results in the height of the solder bumps remaining on LSI 10 becoming nonuniform.

Further, it was learned that it is desirable for the depth h1 of the grooves (concave portions) formed on the surface of Cu plate 20 to be less than the average height h2 of the solder bumps. For example, when the average height h2 of the solder bumps is 0.2 mm, it is desirable for the depth h1 of the grooves (concave portions) formed on the surface of Cu plate 20 to be less than 0.2 mm. In this embodiment, h1 is 0.05 mm.

Next, the inventors carried out studies of the load placed on an LSI 10 by weight 40. As a result of this, it was learned that it is desirable for the load placed on LSI 10 to be from $0.52 \times 10^{-3}$ (gf) to $2.2 \times 10^{-3}$ (gf) per solder bump including the self-weight of the LSI. The inventors conducted an experiment regarding this. The self-weight of the bare chip-type LSI 10 utilized in this experiment was 0.55 g. Further, there were 4,086 solder bumps 12 formed on LSI 10. Therefore, when weight 40 was not used, the load per solder bump was $0.13 \times 10^{-3}$ (gf). The above-mentioned leveling process was implemented using this LSI 10. However, in this experiment, weight 40 was not used. In this experiment, the transfer of molten solder to Cu plate 20 was not performed adequately. Thus, the heights of the solder bumps remaining on LSI 10 were too high. New solder bumps were formed on LSI 10 after implementing the leveling process. It was learned that connection defects are apt to occur during repair work when there is a large amount of residual solder.

Furthermore, when the load per solder bump becomes large, the amount of solder transferred to Cu plate 20 increases, with the result that the amount of solder remaining on the LSI decreases.

Next, the inventors carried out studies of solder melting conditions. It was learned that the heating temperature of the base heater 30, for example, should preferably be higher than the melting point temperature of solder by 10° C. or more. Base heater 30 is built so that the temperature on the surface thereof varies as little as possible. However, slight temperature irregularities exist on the surface of base heater 30. Further, solder bumps 12 adhering to LSI 10 were melted one time when LSI 10 was removed from the wiring substrate, but hardened thereafter. Thus, the heights of the solder bumps 12 are not uniform. Because of this, when LSI 10 is mounted on top of Cu plate 20, the state of contact of solder bumps 12 and Cu plate 20 does not achieve uniformity. When these circumstances are taken into-consideration, to melt all of a plurality of solder bumps 12, it is best to heat LSI 10 to a temperature higher than the melting point temperature of solder by 10° C. or more.

Furthermore, since flux is used in this leveling process, there is no need to make the heating temperature extremely high to melt all of the solder bumps 12.

Further, the ideal time from the melting of the solder to the separation of LSI 10 from Cu plate 20 is 30 seconds or longer. If this time is short, for example, if it is 10 seconds, the amounts of solder transferred to Cu plate 20 become nonuniform.

Next, the inventors studied the distance between suction head 50 and weight 40. When the distance between suction head 50 and weight 40 is too great, the shock when LSI 10 is attracted to suction head 50 via weight 40 is considerable. As a result of this, there is the risk of damage being caused to LSI 10. Conversely, suction head 50 attracts LSI 10 in a state in which the solder is molten. Thus, when the distance between the attracted LSI 10 and Cu plate 20 is too short, the molten solder does not separate completely from LSI 10. Consequently, the transfer of solder to Cu plate 20 is inadequate.

The inventors conducted experiments by changing the distance H between suction head 50 and weight 40 from 0.3 mm, to 0.5 mm, 0.7 mm, 0.9 mm and 1.1 mm. When the distance H was 0.3 mm, the heights of the solder bumps remaining on LSI 10 were extremely irregular. Further, when the distance H was 1.1 mm, there were instances when the LSI was attracted in a tilted condition when LSI 10 was subjected to suctioning. For this reason, short circuits occurred between solder bumps, and the height of the solder remaining on LSI 10 became highly irregular. Conversely, experiment results were good when the distance H was between 0.5 mm and 0.9 mm. When the distance H was 0.7 mm in particular, the height of the solder remaining on LSI 10 exhibited the least irregularities. In this experiment, the average height of the solder bumps 12 remaining on LSI 10 was 130 µm before the leveling process was implemented. Further, the maximum value of the height of the solder bumps 12 was 210 µm. Therefore, the distance H between suction head 50 and weight 40 was ideal when it fell within the scope of between 2.4-times and 4.3-times the maximum value of the height of the residual solder bumps.

Further, it was learned that the suctioning pressure by suction head 50 should preferably be greater than 0.5 MPa. When suctioning pressure was less than 0.5 MPa, there were instances when an LSI was attracted in a tilted condition, and the height of the residual solder became irregular.

It was learned that by carrying out the leveling process under the above conditions there was no unnecessary load exerted on, nor any damage caused to LSI 10. Further, molten solder could be removed from LSI 10 to the extent desired. In the experiments conducted by the inventors, irregularities in the height of the solder remaining on the LSI were held to an average of ±25 µm.

As explained hereinabove, according to this leveling process, solder can be removed without causing damage to a bare chip-type LSI. Further, the height of the solder remaining on an LSI can be made uniform to within acceptable levels.

What is claimed is:

1. A solder removing system for removing solder adhering to an LSI, comprising:
    a heater having a flat-shaped upper surface;
    a plate-shaped first member being mounted on said upper surface of a heater and having an upper surface on which the LSI is placed so as to cause molten solder to adhere thereto;
    a second member being mounted on top of the LSI for adding a load to the LSI;
    a suction unit positioned over said heater; and
    a moving unit for moving either said heater or said suction unit in a X-Y-Z directions;

wherein said heater heats said first member and the LSI to melt the solder and transferring this solder to said first member;

wherein said moving unit moves either said heater or said suction unit so as to position said suction unit at a location a predetermined distance away from a top surface of said second member; and wherein said suction unit attracts said second member and the LSI so as to separate the LSI from said first member.

2. The system according to claim 1,
wherein said first member is a Cu plate.

3. The system according to claim 1,
wherein a plurality of parallel first grooves and a plurality of parallel second grooves are formed so as to intersect one another on said upper surface of said first member.

4. The system according to claim 1,
wherein said upper surface of said first member is of a mesh shape with irregularity.

5. The system according to claim 2,
wherein plating is performed on said upper surface of said Cu plate.

6. The system according to claim 2,
wherein Ni and Au plating is performed on said upper surface of said Cu plate.

7. The system according to claim 1,
wherein said second member is a weight formed using an arbitrary material.

8. The system according to claim 7,
wherein at least one trough hole is formed in said weight.

9. The system according to claim 7,
wherein said weight is a cylindrical member formed from plastic.

10. The system according to claim 7,
wherein a convex portion is formed on a bottom surface of said weight and a gum ring is mounted to said convex portion.

11. The system according to claim 1,
wherein said heater heats said first member and the LSI up to a temperature, which is higher than the melting point temperature of the solder adhering to the LSI by 10° C. or more.

12. The system according to claim 1,
wherein said moving unit positions said suction unit at a location between 0.5 mm and 0.9 mm away from said top surface of said second member.

13. The system according to claim 1,
wherein said predetermined distance is a distance of between 2.4 times and 4.3 times the maximum value of the height of the solder adhering to the LSI.

14. The system according to claim 1,
wherein said suction unit attracts the LSI after a lapse of 30 seconds or longer after the solder has been molten.

15. A solder removing system for removing solder bumps adhering to an LSI, comprising:

a heater having a flat-shaped upper surface;
a Cu plate being mounted on said upper surface of a heater and having an upper surface on which the LSI is placed so as to cause molten solder bumps to adhere thereto;
a weight being mounted on top of the LSI for adding a load to the LSI;
a suction unit positioned over said heater; and
a moving unit for moving either said heater or said suction unit in a X-Y-Z directions;
wherein said heater heats said Cu plate and the LSI to melt solder bumps and transferring those solder bumps to said Cu plate;
wherein said moving unit moves either said heater or said suction unit so as to position said suction unit at a location a predetermined distance away from a top surface of said weight; and
wherein said suction unit attracts said weight and the LSI so as to separate the LSI from said Cu plate.

16. The system according to claim 15,
wherein a plurality of parallel grooves is formed on said upper surface of said Cu plate, and the pitch p1 of each groove is no greater than the array pitch p2 of the solder bumps.

17. The system according to claim 15,
wherein a load placed on each solder bump by said weight and the LSI itself constitutes between $0.52 \times 10^{-3}$ (gf) and $2.2 \times 10^{-3}$ (gf).

18. The system according to claim 15,
wherein said predetermined distance is a distance of between 2.4 times and 4.3 times the maximum value of the height of solder bumps adhering to the LSI.

19. A solder removing system for removing solder adhering to an object, comprising:

a heater having a flat-shaped upper surface;
a plate-shaped first member being mounted on said upper surface of a heater and having an upper surface on which the object is placed so as to cause molten solder to adhere thereto;
a second member being mounted on top of the object for adding a load to the object;
a suction unit positioned over said heater; and
a moving unit for moving either said heater or said suction unit in a X-Y-Z directions;
wherein said heater heats said first member and the object to melt the solder and transferring this solder to said first member;
wherein said moving unit moves either said heater or said suction unit so as to position said suction unit at a location a predetermined distance away from a top surface of said second member; and
wherein said suction unit attracts said second member and the object so as to separate the object from said first member.

* * * * *